United States Patent [19]

Fujimoto

[11] Patent Number: 5,141,474

[45] Date of Patent: Aug. 25, 1992

[54] DAMPER DISC

[75] Inventor: Shinji Fujimoto, Neyagawa, Japan

[73] Assignee: Kabushiki Kaisha Diakin Seisakusho, Osaka, Japan

[21] Appl. No.: 759,764

[22] PCT Filed: May 25, 1989

[86] PCT No.: PCT/JP89/00524

§ 371 Date: Mar. 6, 1990

§ 102(e) Date: Mar. 6, 1990

[87] PCT Pub. No.: WO90/00690

PCT Pub. Date: Jan. 25, 1990

Related U.S. Application Data

[63] Continuation of Ser. No. 465,207, Mar. 6, 1990, abandoned.

[30] Foreign Application Priority Data

Jul. 12, 1988 [JP] Japan .............................. 63-174239

[51] Int. Cl.⁵ ............................................. F16D 3/12
[52] U.S. Cl. .................................... 464/67; 192/106.2
[58] Field of Search ................................... 464/66–68; 192/106.2

[56] References Cited

U.S. PATENT DOCUMENTS

| 4,240,532 | 12/1980 | Blomquist | 192/106.2 X |
| 4,646,886 | 3/1987 | Nishimura | 192/106.2 X |
| 4,816,006 | 3/1989 | Friedmann | 464/67 |
| 4,903,803 | 2/1990 | Koshimo | 192/106.2 X |

Primary Examiner—Daniel P. Stodola
Assistant Examiner—William G. Battista, Jr.
Attorney, Agent, or Firm—Armstrong & Kubovcik

[57] ABSTRACT

A damper disc in which an input plate, an output plate, and damper discs for coupling them are disposed, and moreover damper spring holding plates, and driving plates disposed between adjacent springs are provided as mutually independent parts, the fixing part to be fixed to the input plate, and the outside support part and inside support part for supporting the outer circumference of the damper springs from outward and inward in the disc radial direction are provided on the holding plates, the fixing part fixed to the input plate and the coupling part to be coupled to the end of the spring are disposed on the driving plates, and a part to be fitted to the outer circumference of the outside support part of the holding plate is disposed on the outer circumference of the input plate.

1 Claim, 1 Drawing Sheet

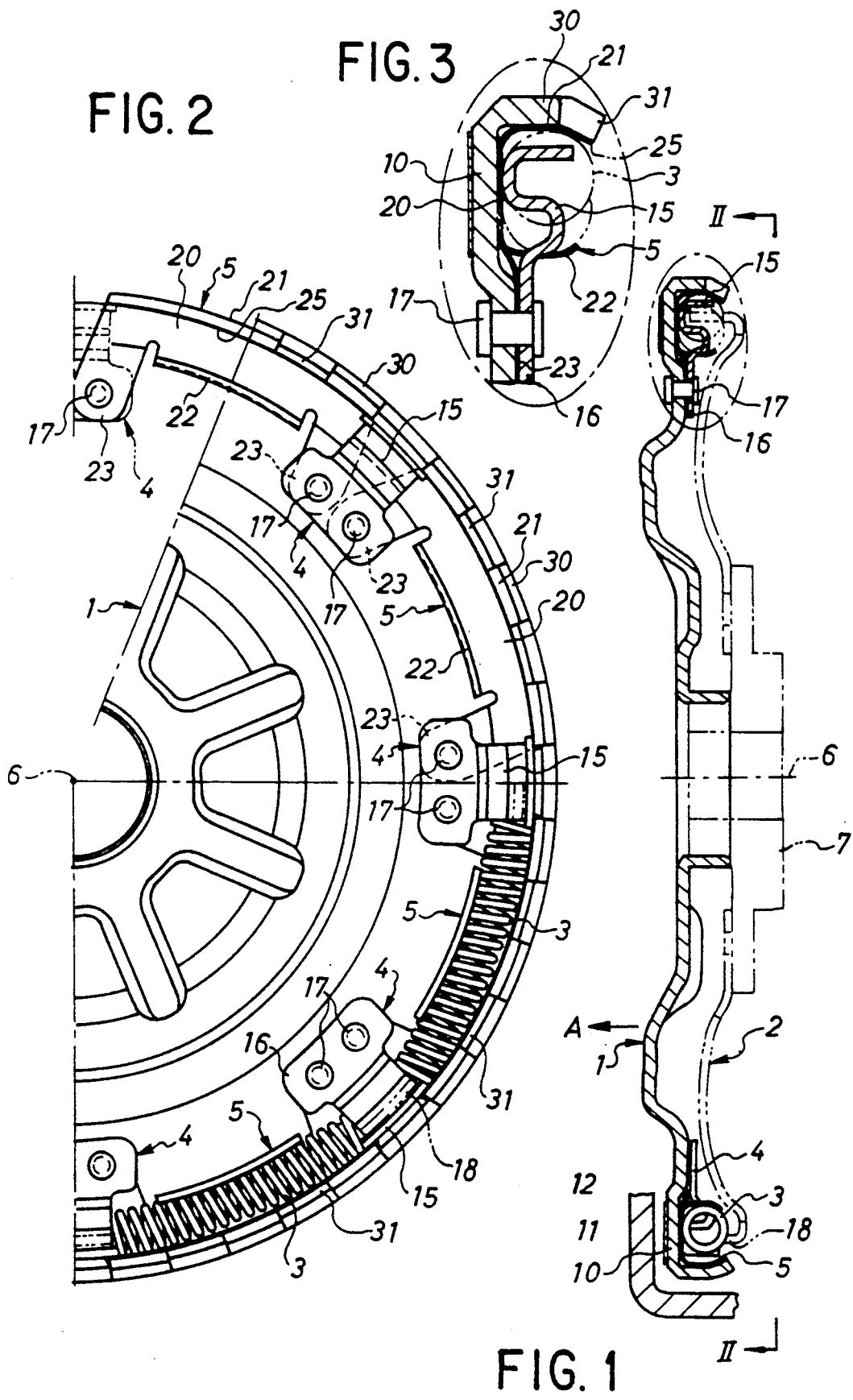

DAMPER DISC

This application is a continuation of application Ser. No. 465,207 filed Mar. 6, 1990, now abandoned.

BACKGROUND OF THE INVENTION

1. Field of the Invention

The present invention relates to a damper disc used in a lock-up clutch of automotive torque converter or the like, and more particularly to the improvement of the structure for holding the damper spring in such damper disc.

2. Description of the Prior Art

In the Japanese Utility Model Application 61-170593 by the present applicant, a damper disc similar to the present invention is disclosed. Such damper disc comprises an input plate (piston) mounting an abrasion facing for input, an output plate fixed to turbine (turbine shell or turbine hub), and a damper spring (coil spring) for coupling the two plates, and also a holding plate for supporting the spring is provided.

This holding plate is fixed to the input plate, and a linkage part (pawl) linking in the circumferential direction is provided at the end portion of the spring. Therefore, the input plate is coupled to the spring by way of the holding plate. The holding plate is also designed to hold the spring in the radial direction, and accordingly it comprises a tubular inside support part stretching along the inner circumference of the spring, and a tubular outside support part stretching along the outer circumference of the spring. Furthermore, there is also an outside part on the outer circumference of the input plate.

According to this structure, when the spring is about to move in the operating state outward in the radial direction by the centrifugal force, the spring is supported by this outside support part to arrest such movement, so that the specified action may be effected securely by stabilizing the position of the spring. In this operation, moreover, since the outer circumference of the outside support part is supported by the outer end of the input plate, extreme deformation of the outside support part in the radial direction by the centrifugal force from the spring may be prevented.

However, since the support plate is treated for hardening, the stiffness is high, and the input plate is also high in stiffness, and therefore it is difficult to assemble the holding plate into the input plate by elastically deforming the both plates in the assembling process. As a result, considering the dimensional errors of the both plates, in the assembling process, it is necessary to set the outside diameter of the support part smaller than, if very slightly, than the outer end of the input plate in order to fit the outside support part of the holding plate into the outer end of the input plate. Accordingly, a slight gap is formed between the support part and the tubular part, and when the support part receives the centrifugal force from the spring as mentioned above, the support part is deformed outward in the radial direction by the portion of this gap, so that a crack may be formed in the holding plate.

The invention is intended to present a structure capable of solving the above problems.

SUMMARY OF THE INVENTION

To achieve the object, the invention presents a damper disc wherein plural holding plates for supporting the springs stretching in an arc form along each damper spring, and plural driving plates disposed between adjacent springs are provided as mutually independent parts, fixing parts to be fixed on input plates and outside support parts and inside support parts for supporting the outer circumference of the damper springs from both inward and outward in the disc radial direction are disposed on the holding plates, fixing parts to be fixed on input plates and linking parts to be linked to the end portions of springs in the circumferential direction are disposed on the driving plates, the input plates are coupled to the springs by way of the driving plates, and parts to be fitted with the outer circumference of the outside support parts of the holding plates are disposed on the outer circumference of the input plates.

According to this structure, in the assembling work, when assembling the holding plate into the inside of the outer end of the input plate, since the holding plate is in an arc shape, the support part may be tightly fitted to the inner circumference of the outer end of the input plate.

Therefore, in the running state, if a centrifugal force is applied to the support part of the support plate from the spring, the support part will be hardly deformed significantly outward in the radial direction. Besides, since the holding plate and driving plate are separate parts, if the support part of the holding plate is deformed somewhat together with the outer end of the input plate, cracks will not be formed in the holding plate and driving plate, and in the boundary of the both plates.

BRIEF DESCRIPTION OF THE DRAWINGS

FIG. 1 is a longitudinal sectional view of a clutch disc according to the invention, FIG. 2 is a partially cut-away II—II view of FIG. 1.

FIG. 3 is an enlarged view of the portion marked by a circle at the upper end of FIG. 1.

DESCRIPTION OF THE PREFERRED EMBODIMENT

FIG. 1 is a longitudinal view of a clutch disc according to the invention, and FIG. 2 is a partially cut-away II—II view of FIG. 1. The illustrated clutch disc is incorporated into the torque converter, and forms a lock-up clutch. As shown in FIG. 1, the clutch disc comprises an input plate 1, an output plate 2, a damper spring 3, a driving plate 4, and a holding plate 5.

The input plate 1 is an annular member extending approximately in the radial direction of an output shaft 6 (of which only center line is shown), and its inner part is slidably fitted on the outer circumference of a turbine hub 7. The outer circumference of the input plate 1 indicated by reference number 10 is annular and is extending in the radial direction of the output shaft 6, and an annular facing 11 is adhered to one surface of this part 10.

In the clutch cut-off state in FIG. 1, the facing 11 is opposite with a gap to the inside of a front cover 12. The front cover 12 is a member for composing the input part of the torque converter, and is coupled with the engine flywheel (not shown), and the outer front end part (not shown) is fixed to the impeller of the torque converter.

Although not shown in the drawing, the control device of the lock-up clutch controls the oil pressure on both sides of the input plate 1, and when the input plate 1 is moved in the direction of arrow A by such oil pressure, the facing 11 abuts against the front cover 12, so that the torque is transmitted from the front cover 12 to the input plate 1, thereby connecting the clutch.

The output plate 2 is positioned at the opposite side of the front cover 12 across the input plate 1, and the inner circumferential part is fixed to the turbine hub 7. The outer circumference of the output plate 2 is coupled with the input plate 1 by way of the damper spring 3 as described later. Therefore, when the clutch is connected in this way, the torque transmitted from the front cover 12 to the input plate i is transmitted to the output plate 2 by way of the damper spring 3, and is further transmitted to the output shaft 6 from the output plate 2 by way of the turbine hub 7.

As shown in FIG. 2, there are plural (eight, in this embodiment) damper springs 3 disposed at intervals in the circumferential direction of the clutch disc, individually extending in the circumferential direction (in an arc form) near the outer circumference of the input plate 1.

The driving plate 4 is disposed between adjacent two damper springs 3 each, and comprises a linkage part 15 in a folding structure, and a flat fixing part 16 integrally stretching inward in the radial direction from the inside of the linkage part 15. Each fixing part 16 is fixed to the input plate 1 by means of two rivets 17. As shown in FIG. 1, the linkage part 15 is approximately in an S-form in the section in its radial direction. As shown in FIG. 2, the linkage part 15 is inserted between adjacent two damper springs 3 so as to be engaged with the end portion of the damper springs 2 in the disc circumferential direction.

On the outer circumference of the output plate 2, a linkage part 8 of folding structure is provided. This linkage part 18 is placed between the intermediate part and outer part of the linkage part 15 of S-section, and is engaged with the end portions of the damper springs 3 at its both sides in the circumferential direction.

There are as many holding plates 5 as the damper springs 3, and they are individually disposed along the damper springs 3. As shown in FIG. 1, each holding plate 5 integrally comprises an annular part 20, an outside support part 21, an inside support part 22, and a fixed leg part 23.

The annular part 20 has its section extended in the radial direction of the output shaft 6, and is located between the part 10 and damper spring 3 in the state of tightly contacting with the part 10 of the input plate 1.

The outside support part 21 is projecting from the outer circumference of the annular part 20 approximately in the axial direction (the direction parallel to the output shaft 6) up to the outside in the radial direction of the damper spring 3, and its front end part 25 is bent inward in the radial direction along the outer circumference of the damper spring 3. Therefore, the outside support part 21 supports the damper spring 3 at the outside of spring 3 in the radial direction of input plate 1.

The inside support part 22 projects from the inner circumference of the annular part 20 in the same direction as the outside support part 21, and its front end part is bent outward in the radial direction. Therefore, the inside support part 22 supports the damper spring 3 from the inside of spring 3 and in the radial direction of input plate 1.

As shown in FIG. 2, the circumferential length of the annular part 20 and outside support part 21 is nearly same as that of the damper spring 3. The circumferential length of the inside support part 22 is slightly shorter than that, and it is disposed at other parts than the both end portions of the holding plate 5.

The fixed leg part 23 is extending from both end portions of the annular part 20 inward in the radial direction, and is fixed to the input plate 1 by the rivets 17 in the state of being placed between the fixing part 6 of the adjacent driving plate 4 and the input plate 11.

On the outer edge of the input plate 1, there is a part 30 tightly fitted to the outer circumference of the outside support part 21. Furthermore, at the front end portion of the part 30, plural folding protrusions 31 are disposed at intervals in the circumferential direction, and these protrusions 31 are tightly fitted to the outer circumference of the folding front end portion 25 of the holding plate 5.

In this structure, the torque transmitted to the input plate 1 is further transmitted to the damper spring 3 from the linkage part 15 of the driving plate 4 as mentioned above, and is also sent into the linkage part 18 of the output plate 2 from the damper spring 3. Thus, the damper spring 3 is compressed, but however the damper spring 3 is extended or contracted, the holding plate 5 securely supports the damper spring 3 in the axial direction and radial direction, thereby preventing the damper spring 3 from being dislocated from the specified position.

In particular, when the clutch disc rotates at high speed, a strong centrifugal force is generated in the damper spring 3, and its centrifugal force is transmitted to the outside support part 21 of the holding plate 5, but since the outside support part 21 is in tight contact with the part 30 as mentioned above, the outside support part 21 will not be deformed significantly. Besides, since the holding plate 5 and driving plate 4 are different parts, if the holding plate 5 is deformed somewhat together with the part 30, crack will not be formed in the holding plate 5 or driving plate 4 or in the boundary of the both plates 4, 5.

Referring now to the assembling work, since the holding plate 5 is an arc-shaped part, the outside support part 21 can be assembled into the input plate 1 by tightly contacting with the inner circumference of the part 30. Therefore, as mentioned above, the deformation of the outside support part 21 may be suppressed by the part 30.

The function of the parts is as mentioned above, and in consideration thereof, the dimensions and material characteristics of the driving plate 4 and holding plate 5 are selected as follows.

That is, each holding plate 5 is made of a tough thin plate large in the allowable elastic deformation on the whole. Each driving plate 4 is made of a rigid, relatively thick plate treated for hardening. Of course, the input plate 1 is made of a thick (strong and rigid) plate.

Thus, according to the invention, since the holding means for holding the damper spring 3 and the coupling means for coupling with the damper spring 3 are composed of separate members (holding plate 5 and driving plate 4), they may be formed by using the plate materials having the thickness and quality suited to different applications (holding of spring, and coupling). Therefore, preventing breakage of the holding plate 5, the rotation strength of the entire clutch disc may be enhanced.

Besides, since a thin member may be used for the holding plate 5, the material cost and weight may be reduced. Of course, since the holding plate 5 may be assembled by tightly contacting with the part 30 of the input plate 1, the damper spring 3 may be supported in stable state also in this respect. Moreover, by using a thin member for the holding plate 5, the damper spring 3 of a large diameter may be used within a limited space, and therefore the vibration absorption may be enhanced.

Still more, since the driving plate 4 and holding plate 5 are composed of plural parts, the material yield is improved as compared with the case of forming the entire structure by using one annular part, and what is more the complicated window opening and other machining are not needed, and the process may be simplified.

In addition, according to the invention, since the individual holding plates 5 are made of members stretching in the circumferential direction in a relatively short range, the allowable deflection of the outside support part 2 is large. Therefore, for example, when assembled with a dimensional error, if a gap is produced between the outside support part 21 of the holding plate and the outside part 30 of the input plate 1 to deflect the outside support part 21 outward in the radial direction by centrifugal force in operating state, formation of crack due to deflection in the holding plate 5 may be effectively prevented. If cracked, propagation of crack may be arrested within the individual holding plates 5.

What is claimed is:

1. A damper disc comprising an annular input plate, an annular output plate, and plural damper springs for coupling said input and output plates in the circumferential direction of rotation of said plates, said damper springs being disposed at intervals in the circumferential direction of said input and output plates and extending in an arc along the circumferential direction of said input and output plates, damper spring holding plates interposed within a circular recess formed at the circumferential edge portion of said input plate and fixed to the input plate and extending in an arc in the circumferential direction of the input plates for supporting said damper springs from the inside and outside of said damper springs in the radial direction of said input plate and driving plates fixed to said input plate and disposed between ends of adjacent damper springs, said holding plates each having a pair of fixed leg parts extending radially inwardly at the opposite end portions of said holding plates and secured to said input plate, said driving plates each having a fixed part secured with said fixed leg parts of said adjacent holding plates to said input plate and a linkage part for linking the end portions of said adjacent damper springs to be compressible in the circumferential direction of said input and output plates.

* * * * *

UNITED STATES PATENT AND TRADEMARK OFFICE
CERTIFICATE OF CORRECTION

PATENT NO. : 5,141,474

DATED : August 25, 1992

INVENTOR(S) : FUJIMOTO

It is certified that error appears in the above-identified patent and that said Letters Patent is hereby corrected as shown below:

On the title page, Item [73], first line, "Diakin" should read --Daikin--.

Signed and Sealed this

Twenty-eighth Day of September, 1993

Attest:

BRUCE LEHMAN

Attesting Officer     Commissioner of Patents and Trademarks